United States Patent Office 2,772,223
Patented Nov. 27, 1956

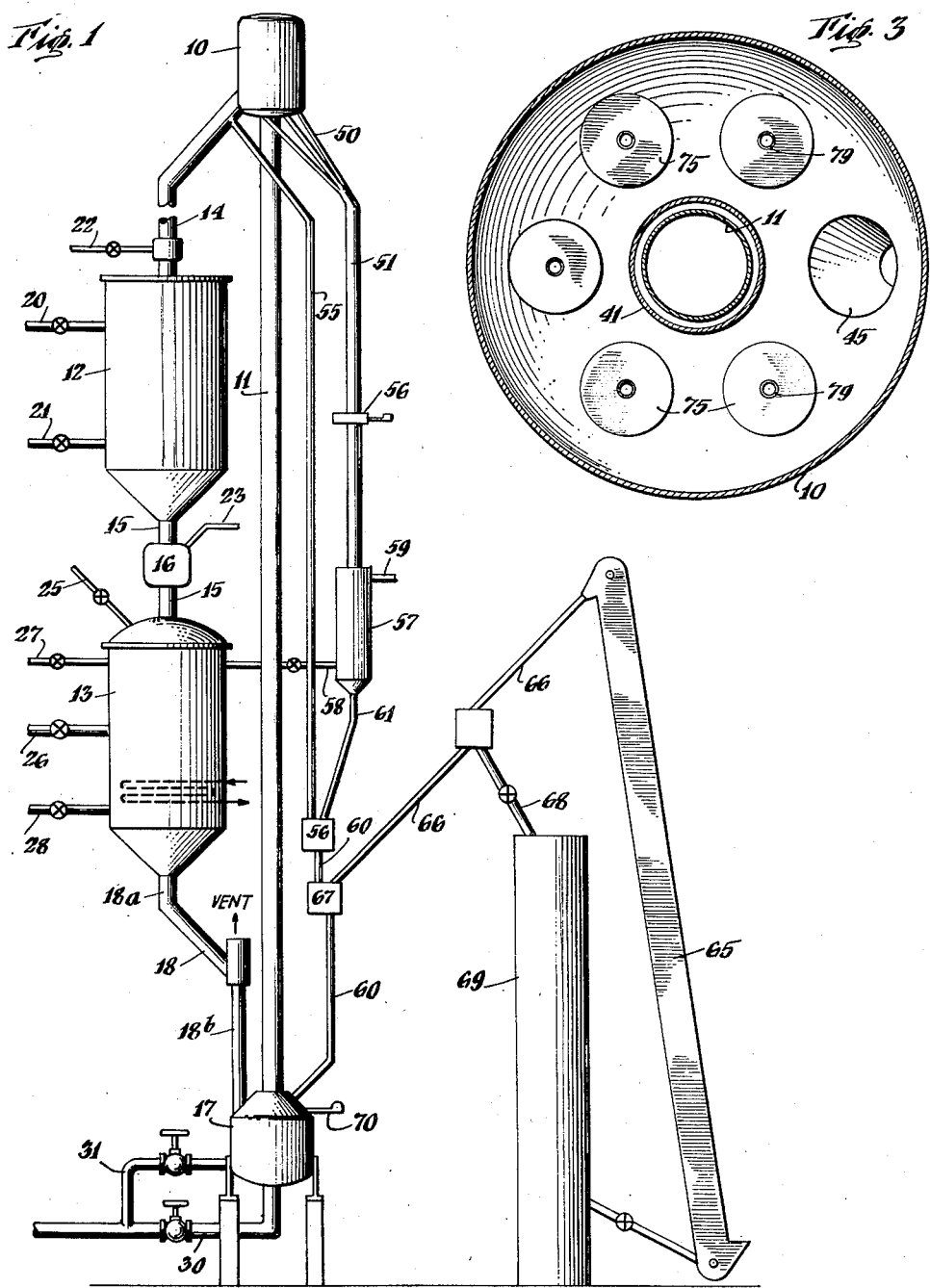

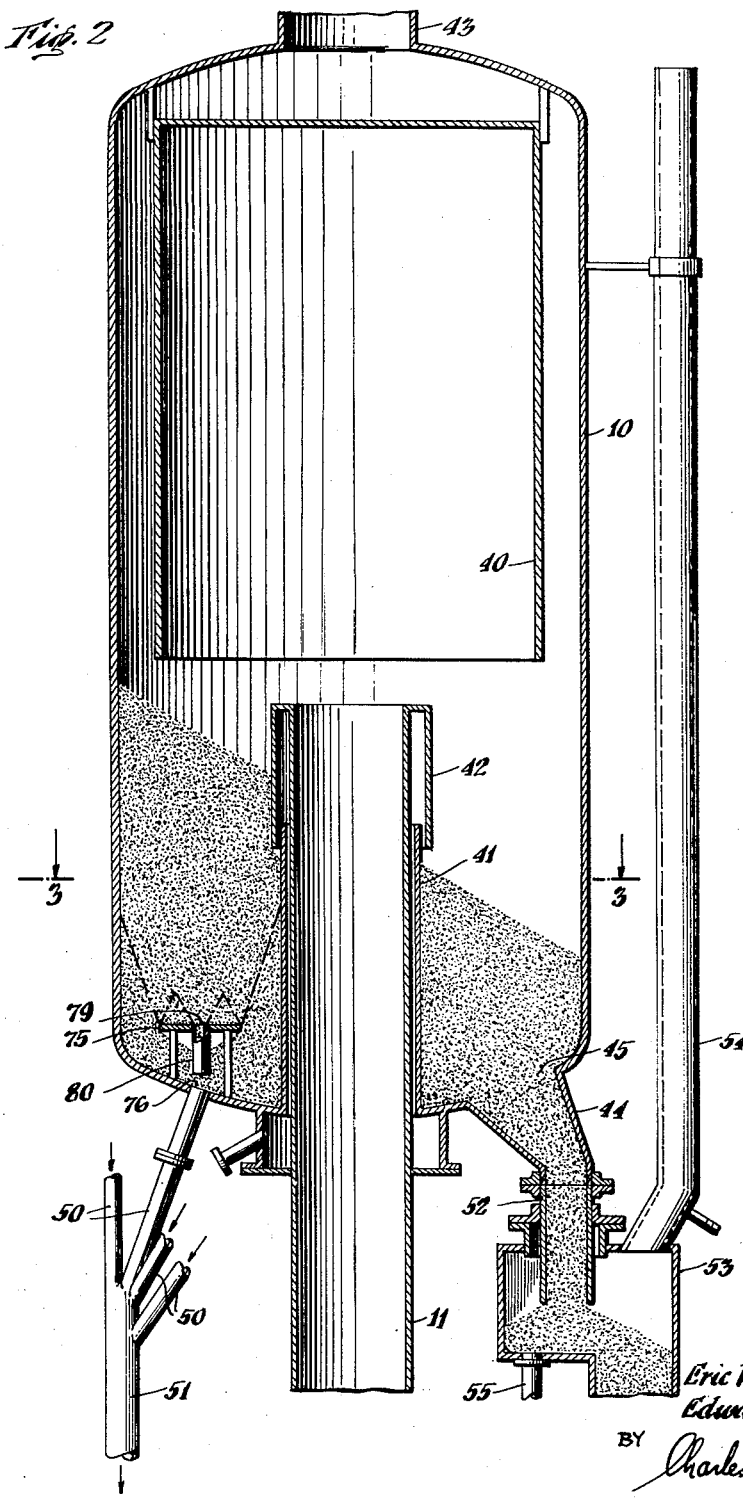

2,772,223

METHOD AND APPARATUS FOR CONTINUOUSLY REMOVING FINES FROM A MOVING BED CONVERSION SYSTEM

Eric V. Bergstrom, Short Hills, and Edward R. J. Sorf, New Brunswick, N. J., assignors to Socony Mobil Oil Company, Inc., a corporation of New York Application June 22, 1951, Serial No. 233,056

17 Claims. (Cl. 196—52)

This invention is directed to improvements in the conversion of hydrocarbons in the presence of gravitating masses of particle-form solid contact material. It is more particularly concerned with the continuous removal of fine powdery material from the moving contact material stream. It provides a method of and apparatus for accomplishing that purpose.

Many processes are now known in which hydrocarbons are continuously converted in the presence of a gravitating substantially compact column of solid granular particles. Typical processes are hydrogenation, dehydrogenation, cyclization, desulfurization, reforming of naphtha and gasoline, isoforming, alkylation and cracking of hydrocarbon fractions. For example, in the cracking of high boiling fractions to produce increased yields of motor gasoline, the hydrocarbons, prepared for reaction, are continuously introduced into one end of a gravitating substantially compact column of the catalyst and passed through the voids between the particles to outlets at the other end of the column. The reaction bed is maintained at temperatures of about 800–1000° F. to effect the cracking of the reactants. The reactants may be introduced into the bed as liquids, vapors or a mixture of both. During passage through the bed as much as 30–45 percent or more of the high boiling materials may be converted to gasoline.

As the granules pass downwardly through the conversion zone, they are coated with a carbonaceous deposit. If the solid material is a catalyst, the catalytic activity of the material is reduced by the presence of the "coke" deposits. If the solids are of inert material used primarily as a heat carrier, they lose heat during the cracking reactions and must be continuously reheated. In either case, the particles are continuously removed from the bottom of the conversion zone and carried to a kiln where the deposits are burned and thereby removed from the solid particles. The particles are gravitated through the regeneration or burning zone in the form of a substantially compact column of gravitating particles. Air is blown through the voids between the particles and flue gas is withdrawn from the end of the column. The temperature in the kiln is maintained at about 1000–1300° F. or thereabouts, if catalytic material is being regenerated to avoid heat damaging the particles. If inerts are used, the temperature may be much higher, depending on the nature of the inert material used.

The catalytic material may be natural or treated clay in granular form or certain synthetic associations of silica, alumina or silica and alumina. These and other catalytic materials are well known in the art and are available in various commercial forms, such as pellets, pills or spheres. Irregular shaped granules may be used but uniform shapes are preferred, the spherical beads being most preferred. The size of the particles may range broadly from about 3–100 mesh Tyler screen analysis, or preferably 4–10 mesh Tyler. For any particular application, however, it is desirable that the particles be closely related in size and shape, so that the gas or vapor will be readily distributed in a uniform manner throughout the entire cross-section of the bed. For this purpose the particles may be, for example, graded so that 85 percent will pass a No. 5 screen and 85 percent will be retained on a No. 9 screen. This helps to prevent channelling of the gas through the bed in restricted paths, thereby effecting more favorable conversion and burning reactions.

Another factor causing channelling in these systems is the presence of powdery material or fines in the catalyst. Fines are produced by the erosion of the granules rubbing against each other or the metal retaining walls. Fines are also produced when the particles bang against each other or impinge upon metal walls in the system. The fines are substantially smaller in size than the average particle size of the granules, for example, of the order of 10–400 mesh Tyler. They gather and tend to fill in the voids between the catalyst granules, making gas flow through the beds more difficult. The fines tend to accumulate in regions or zones, causing the gas to be diverted to the paths of least resistance. Where attrition rates are high this channelling is serious and, hence, must be avoided.

In spite of efforts to minimize attrition of the catalyst or inerts, fines are produced at more or less fixed rates, depending upon the circulation rate, strength of the catalyst, temperature of the zones, design of the conversion system and conveying means, among other contributing factors. It has been the practice in this art to continuously remove fines from the catalyst stream as the granular particles are circulated through the system. Fahnestock et al., U. S. Patent No. 2,434,843, for example, shows a procedure of removing a side stream of catalyst from the main catalyst stream which contains a greater concentration of fine particles than the main stream. There the catalyst is continuously rolled down a chute and the side stream is removed from the bottom of the chute. The fines tend to gather on the bottom of the chute. The fines are removed from the side stream by passing the catalyst downwardly through an elutriator. The catalyst is allowed to fall through an upwardly flowing gas. The gas flow rate is controlled to effect upward transfer of the fines and yet allow downward movement of the granular material. The fines-free material is returned to the main stream.

The pre-classification of the catalyst in the inclined chute has been found to be less effective than desired. This is caused primarily by the compacting of the catalyst in the sloping chute whereby the fines are locked in by the closely packed particles and fail to move downwardly through the catalyst voids. This defect is more pronounced the more nearly vertical the chute angle or the more compacted the column of catalyst.

Recently it has been found commercially possible to pneumatically lift the granular catalyst from a location beneath one of the vessels to a settling vessel or zone above the other vessel. In order to avoid duplication in the system, the settling vessel is made to serve as a surge hopper and catalyst is gravitated downwardly as a substantially compact column from the hopper to the top of the reaction vessel. The column is made long enough to provide a seal at the top of the reaction vessel, permitting operation of the vessel at advanced pressures without requiring special locks to effect feeding of catalyst thereinto. The seal is found most effective when the feed leg is substantially vertical. In order to avoid using additional hoppers and conduits, and enlarging the existing structure, an improved pre-classifying procedure was sought.

It has been discovered that when granules and fines are poured onto the surface of a bed of contact material and the material is maintained loosely packed by continuously moving particles downward across the entire cross-section of the bed, the fines trickle downward through the voids. When the granular material is withdrawn through an outlet of restricted cross-section, covering only a minor portion of the cross-section of the bed, the contact material passing through the outlet is drawn from a conical region above the outlet which is defined by revolving an imaginary line about a vertical axis through the center of the outlet disposed in a vertical plane and directed upwardly and outwardly from the edge of the outlet at the angle of internal flow of the catalyst. For commercial catalyst this may be about 70–85 degrees. The surface of the bed shopes downwardly toward the withdrawal region at the angle of repose of the catalyst, which may be about 30–45 degrees. Granules roll across the surface of the bed to the region above the outlet and are then drawn downward. The only fines passing down with the withdrawn granular material, however, are those passed onto the bed within the area of the withdrawal cone. By making the bed of substantial cross-section, streams of contact material can be withdrawn from locations distributed about the remainder of the bottom of the bed which contain a substantially greater percentage of fine particles than the main stream.

The object of this invention is to provide in a moving bed conversion system improved method and apparatus for effecting the continuous removal of fines from the system.

A further object is to provide improved apparatus and method of pre-classifying the moving contact material in a moving bed hydrocarbon conversion process to provide a stream for elutriation which contains a greater percentage of fines than the main contact material stream.

These and other objects will be made obvious by the following detailed description of the invention in conjunction with the attached sketches to which the descriptive material is referenced.

Figure 1 is a sketch of a unitary moving bed hydrocarbon conversion system.

Figure 2 is a sketch partially in vertical section of the pre-classifying vessel with related apparatus.

Figure 3 is a plan view of Figure 2 as seen on plane 3—3 of Figure 2.

Referring to Figure 1, the system will be described starting with the settling vessel 10 at the top of the pneumatic lift pipe 11. In the system illustrated, the reaction vessel 12 is located over the regeneration vessel 13. The settling vessel 10 is connected to the reactor 12 by means of a substantially vertical, elongated conduit or feed leg 14. The reactor 12 and kiln 13 are connected by the conduit 15. A depressurizing vessel 16 is located in conduit 15. A lift tank or pot 17 is located at the bottom of the lift pipe 11, and the kiln 13 and lift pot 17 are connected by means of a downwardly directed conduit 18.

Catalyst is gravitated downward continuously as a substantially compact column from the settling vessel through the reactor and kiln to the lift tank. The settling vessel 10 may be at atmospheric pressure whereas the reactor is normally operated at an advanced pressure of about 5–30 p. s. i. (gauge). The feed leg 14 must be long enough to effect the continuous introduction of catalyst into the vessel against the advanced pressure. This may require 5 to 7 feet of feed leg conduit, for each pound of pressure differential, or, for example, a conduit 60–80 feet tall. The seal is found more effective when the conduit is maintained substantially vertical, at least during most of its length. Thus, it is undesirable to roll the catalyst downwardly through a sloping chute to effect pre-classification before introducing it into the vertical feed leg, because the height of the structure will be increased thereby. Since the structural steel needed to support the cracking system is expensive, it is important to keep the height of the unit as low as possible.

The reactants are introduced into the reactor 12 through the conduit 20 suitably prepared for conversion. The hydrocarbons pass downwardly through the voids in the bed and the converted products are removed from the vessel through the conduit 21. A small amount of inert seal gas is introduced into the column through the conduit 22 at a pressure slightly greater than the pressure in the reactor. The gas passes upwardly and downwardly through the column, providing a seal against the escape of reactant fluids up the feed leg.

The spent catalyst may be purged after removal from the bottom of the reactor 12. The pressure on the catalyst is released in the depressurizer 16 by allowing gas to escape from the vessel through the conduit 23. An inert gas may be introduced into the column through the conduit 25 to prevent combustion supporting gas from passing upwardly through the column from the kiln 13.

Air is introduced into the kiln through the conduit 26 to effect combustion of the "coke" deposits from the surface of the catalyst. The gases pass upwardly and downwardly through the column and are removed from the vessel through the conduits 27, 28. The regeneration is effected at substantially atmospheric pressure, say, 1 p. s. i. (gauge), for simplicity and safety. The regeneration zone may be cooled by indirect heat exchange coils, as indicated on the drawing. The catalyst withdrawn from the bottom of the kiln is gravitated through the conduit 18a to a vent chamber where gas travelling with the catalyst is vented to the atmosphere. The catalyst is gravitated through the conduit 18b into the top of the lift tank 17. The conduits 18a and 18b are made long enough to provide effective seal between each vessel and the vent chamber, thereby providing for independent operation of the kiln and lift pot or tank.

A primary lift gas is introduced into the lift tank 17 through the conduit 30. The conduit is terminated just below the lower end of the lift pipe or projected into the pipe a short distance. The primary gas enters the lift pipe, therefore, without passing through any substantial thickness of the catalyst bed. A secondary lift gas is introduced through the conduit 31 into the tank 17. It enters the catalyst column at locations about the lower end of the lift pipe, so as to pass through at least a substantial thickness of the bed before entering the lower end of the pipe. The secondary gas pushes the catalyst into the primary stream where it is suspended and lifted up the pipe. The lift tank is disclosed in more detail in copending application for Letters Patent Serial Number 211,258, filed February 16, 1951, now Patent No. 2,695,815.

The lift gas and particles are discharged from the top of the pipe into the settling or pre-classifying vessel 10 disclosed in more detail on Figure 2. Because the vessel 10 is substantially greater in cross-section than the lift pipe 11 and because of the location of the skirt baffle 40, the catalyst drops out of the gas onto the surface of the substantially compact catalyst column which starts in the lower portion of the vesesl. The baffle 41 about the lift pipe allows the lift pipe to expand freely, relative to the vessel 10 but prevents any substantial lateral movement of the pipe 11. The sleeve 42 attached to the upper end of the pipe covers the upper end of the baffle 41 to prevent catalyst from packing in between the lift pipe 11 and the baffle 41. The lift gas escapes upwardly around the outside of the skirt baffle and is withdrawn from the vesesl through the conduit 43.

The main stream of catalyst is withdrawn through the conduit 44 attached to one side of the bottom of the preclassifying vessel 10. The cross-section of the outlet 45 in the bottom of the vessel 10 covers only a minor portion of the cross-section of the bottom of the vessel or, more accurately, the effective cross-section of the vessel. The effective cross-section is defined to be that horizontal cross-section of the preclassifying vessel occupied by the substantially compact bed of catalyst. In this instance, the effective area is the cross-sectional area of the vessel less the cross-sectional area of the lift pipe 11 or, more accurately, less the cross-sectional area of the baffle 41. The catalyst passing through the outlet will draw primarily from a conical region the side wall of which is located at an angle of about 70-85 degrees with the horizontal. The size of the angle will depend somewhat upon the size, shape and nature of the particles. For commercially available catalyst it is usually about 75-80 degrees. This angle is known in the art as the angle of internal flow of the catalyst or contact material.

Because the catalyst is withdrawn from this restricted conical region, the surface level of the catalyst bed above the outlet 45 will drop with respect to the surface level of the rest of the bed. It is found that when the angle of the surface of the bed with respect to the horizontal becomes greater than about 30-45 degrees the granules commence to roll across the surface to the region above the outlet 45. The surface tends to remain at a substantially constant angle, known as the angle of repose of the catalyst or contact material. This angle, like that of the angle of internal flow, depends to some extent upon the size, shape and nature of the material. For commercially available catalyst it is normally about 30-35 degrees.

It has been discovered that the fines do not roll across the surface of the bed with the granules, but tend to trickle down through the bed in a generally uniform manner. Unless the catalyst particles are kept in downward motion across the bed the voids fill with fines and then the fines move laterally to the region above the outlet 45. The bed tends to become compacted, also, and in this condition, the fines are locked in between the granules, traveling laterally with them. By withdrawing catalyst from locations distributed about the remainder of the bottom of the vesesl, however, the bed can be kept loosely packed and moving downwardly across the entire horizontal cross-section. The side stream outlets should be placed close enough together to insure withdrawal of catalyst from all portions of the bed and they are preferably uniformly distributed about the remaining cross-section of the bottom of vessel, excluding the region of the main outlet. Since the fines are uniformly distributed across the top of the bed and the main stream is drawn from only a small portion of the cross-section of the bed, the major portion of the fines is withdrawn through the side stream outlets 50. The conduits 50 are all connected to the top of the conduit 51 to combine the side streams into a single side stream.

It is seen, therefore, that the larger the effective cross-section of the preclassifying vessel with relation to the withdrawal cone of the main stream, the larger the concentration of fines in the side stream. The practical limitations of increased cost and increased weight of larger vessels determine the maximum size of the vessel. A broad operable range of effective cross-section of the vesel to the area covered by the intercept of the withdrawal cone of the main stream with a horizontal plane at the lowest point of the bed surface is about 2-40 to 1. A preferred range for these areas is about 4-20 to 1. The lowest point of the bed surface in commercial installations should be between about 2 to 20 feet above the bottom of the preclassifying vessel.

It is seen that when the particles above the main stream outlet move downwardly at a faster rate than the particles in the rest of the vesesl, the concentration of fines in the main stream is decreased and that in the side streams is increased. For effective operation the velocity of the particles above the main stream outlet should be about 5-800 times that of the particles in the rest of the vessel. The preferred range is about 200-400 times the velocity of the particles above the side stream outlets.

The main catalyst stream is passed through the conduit 52 into the vent box 53 at the top of the feed leg 14. The vent pipe 54 conducts inert gas or vapors away from the vessel 10, preventing the disruption of flow through the conduit 44. A drag stream of catalyst is taken from the vent box 53 through the conduit 55 to a combining box 56 as shown on Figure 1.

Referring now to Figure 1, the combined side stream, rich in fines, is gravitated as a substantially solid column down to the slide valve 56. The catalyst falls from the valve in the form of a shower into the elutriator 57. A gas, such as flue gas, is introduced into the bottom of the elutriator through the conduit 58 to travel upwardly through the descending catalyst. The gas flow rate is controlled so that the fines are lifted with the gas but the granules continue to fall and are drawn from the bottom of the vessel. The gas and fines are exhausted through the conduit 59. The fines-free contact material is introduced into the combining box 56 at a location adjacent the drag stream.

Catalyst is withdrawn from the bottom of the combining box through the conduit 60. The outlet in the bottom of the box is located substantially directly below the inlet in the top of the box through which the fines-free catalyst is introduced. The catalyst is discharged as a solid stream from the bottom of the drag conduit 55 into the combining box 56 at a location laterally displaced from the box outlet. The level of the drag stream inlet is located above the bottom of the combining box sufficient to provide therebelow a pile of catalyst which covers the outlet. The drag stream inlet and the outlet in the bottom of the box are so related that an imaginary line connecting the nearest point of contact of one with the other is disposed at an angle slightly greater than the angle of internal flow of the contact material. For example, if the angle of internal flow is 70 degrees, 75 degrees would be satisfactory. By so locating the drag stream, catalyst is preferentially withdrawn from the side stream rather than the drag stream. However, if the side stream flow rate is reduced for any reason, the bed level in the combining box will drop, allowing catalyst to tumble out of the conduit 55 to roll across the surface of the bed. Thus, the drag stream flow rate increases automatically to maintain the bed level in the box substantially constant. This permits the maintenance of a substantially compact column downward from the box to the lift tank 17. Since the tank 17 is operated under pressure, this column is necessary to provide a seal and also to provide effective smooth feeding of the catalyst into the lift tank. Since the elutriator requires for its operation that the catalyst be in the form of a shower rather than a substantially compact bed, it is important that the level of the catalyst bed in the combining box 56 not rise up through the conduit 61 into the vessel 57. It is seen that this can be effected by making the flow through conduit 60 at least greater than the maximum flow through the elutriator. Details of the combining box 56 and its method of operation are disclosed more completely in copending application for Letters Patent Serial Number 228,293, filed May 25, 1951, now Patent No. 2,656,306.

Fresh catalyst is introduced into the system from time to time to replace attrition losses. The fresh catalyst is lifted by the elevator 65 and discharged through conduit 66 either into a combining box 67, similar to box 56, or through conduit 68 to a fresh catalyst storage bin 69. A slide valve 70, comprising an orifice plate with several orifice openings graded in size, is located at the bottom of the conduit 60 to effect control of the flow rate of the side stream.

The drag stream could be taken directly from the bottom of the pre-classifying vessel 10 if desired. Alternatively it could be taken from the side stream at some point below the pre-classifying vessel 10. It is preferred, however, to take it from the main stream, as indicated, because this stream does not pass through the elutriator before being returned to the main catalyst stream in the lift tank and hence, it is desirable to use catalyst with the smallest percentage of fines.

Referring once again to Figures 2 and 3, it is shown that the side stream outlets are distributed about the bottom of the vessel. The outlets must be located close enough to effect continuous downward movement of the catalyst bed across the entire cross-section. The effective area which can be serviced by one outlet can be enlarged by using appropriately placed baffle plates or tables 75, as indicated. The plates or tables are located above the outlet 76 so that catalyst will roll under the plate at the angle of repose of the catalyst and cover the outlet. Catalyst is drawn about the edge of the baffle from a region of triangular cross-section bounded by lines starting from the edge of the plate and directed upwardly at the angle of internal flow of the catalyst. The table, it is seen, enlarges the cross section of the region through which the catalyst is drawn to the outlet 76. A hole 79 is located in each table at its center to effect withdrawal of some catalyst from the region directly above the plate 75. A conduit 80 is connected beneath the hole terminated at a level beneath the surface of the catalyst under the table and about the outlet 76. By locating the conduit beneath the surface of the catalyst, the catalyst moves downwardly through the conduit at a restricted rate. The proportion of catalyst withdrawn through the conduit 80 to that withdrawn about the edge of the plate can be varied by changing the size of the cross section of the conduit 80. These conduits are sized to effect downward movement of the catalyst across the entire area of the bed at a generally uniform rate, except in the region above the main stream outlet. By using properly designed and located tables uniform downward movement can be effected with substantially fewer withdrawal conduits than would otherwise be required. For example, the number of withdrawal conduits can be reduced from say 100 down to 4.

*Example I*

As an illustration of the invention the following data are presented from operation of a commercial catalytic cracking system having the structure indicated generally on Figure 1. A catalyst total circulation rate of 230 tons per hour was used. Commercial synthetic bead catalyst having a size range of 4–8 mesh Tyler was used.

The shape of the pre-classifying vessel was similar to that illustrated in Figures 2 and 3, and the vessel possessed the following critical dimensions:

Diameter of vessel _____ 14 ft.
Outside diameter of baffle (detail 41 on
  Fig. 2) _____ 41 inch.
Inside diameter of main outlet _____ 14 inch std. pipe.
Inside diameter of side stream withdrawal conduits _____ 4 inch.
No. of side stream withdrawal conduits __ 4.
Diameter of tables (detail 75 on Fig. 2 __ 3 ft.
Diameter of table drop pipe (detail 80
  on Fig. 2) _____ 2 inch std. pipe.
Height of table above withdrawal outlet _____ 1½ ft.

The percentage of fine material, smaller than 8 mesh, in the catalyst discharged from the top of the lift pipe was found to be 1.4 percent, by weight, of the total catalyst. The percentage of fines, smaller than 8 mesh, in the side stream was found to be 20.0 percent by weight of the catalyst. The total withdrawal for both the side streams and drag stream was 12.5 tons per hour, the drag stream being split from the side stream at a location below the pre-classifying vessel.

The specific example is given only as an illustration of the invention, and is not considered as limiting the range of the invention. It is intended that the scope of this invention be considered broadly to cover all changes and modifications of the examples of the invention herein chosen for purposes of the disclosure, which do not constitute departures from the spirit of the invention.

We claim:

1. In a hydrocarbon conversion process wherein particle-form contact mass material is passed cyclically through a hydrocarbon conversion zone and a contact material regeneration zone through which zones its moves as a substantially compact column of solid particles, the method of removing fines resulting from attrition of the cyclically flowing contact material which method comprises: delivering contact material to the top of a gravitating bed of the contact material, withdrawing the main stream of contact material from a minor portion of the bottom of the bed, withdrawing minor streams of contact material and concentrations of fines from a multiplicity of locations distributed about the remaining portion of the bottom of the bed, combining the minor streams, effecting a separation of fines from the combined stream and returning the fines-free contact material to the main stream.

2. In a hydrocarbon conversion process wherein a granular catalyst is passed cyclically through a hydrocarbon conversion zone and a catalyst regeneration zone through which zones it moves as a substantially compact column of solid particles, the method for removing fines resulting from attrition of the cyclically flowing catalyst which method comprises: the steps of passing the cyclically moving stream of catalyst onto a gravitating bed of the catalyst in a pre-clasifying zone of substantial cross-sectional area, withdrawing the main stream of catalyst from beneath the zone through a passage which has a cross-section substantially smaller than that of the pre-classifying zone, withdrawing catalyst from beneath the remainder of the pre-classifying zone at a multiplicity of locations and combining the separate streams into a single side stream of catalyst which has a substantially greater concentration of fines than the main stream, the flow of catalyst through the side stream being controlled at a rate amounting to only a minor fraction of the rate of flow through the main stream, so that the downward velocity of the catalyst in the pre-classifying zone above the main stream passage is about 5–800 times the downward velocity of the catalyst above the side stream withdrawal locations, passing the side stream through a fines-removal zone to effect removal of the fines and returning the fines-free catalyst to the main catalyst stream.

3. In a hydrocarbon conversion process wherein a granular contact material is passed cyclically through a hydrocarbon conversion zone and a contact material regeneration zone through which zones it moves as a substantially compact column of solid particles, the method for removing fines resulting from attrition of the cyclically flowing contact material which method comprises: the steps of gravitating the cyclically moving stream of contact material downwardly as a substantially compact column from beneath one of the contacting zones to a feeding zone located therebelow, contacting the contact material with a lift gas in said feeding zone to suspend and transport the material upwardly through an elongated, laterally-confined passage, discharging the contact material from the top of the passage onto the surface of a substantially compact gravitating bed of the material in a settling zone located above the other contacting zone, withdrawing the main stream of contact material from beneath the settling zone downwardly through a passage in the form of a substantially compact column, discharging the main stream of contact material into the top of the other contacting zone, the cross-section of the passage being substantially smaller than half the cross-section of the settling zone, withdrawing side streams of contact material from beneath the settling zone at a multiplicity of locations substantially equally distributed about the remaining cross-section of the zone, so as to keep the contact material moving downwardly at a rate which is fast enough to permit the fine particles to trickle downwardly through the contact material, the downward velocity of the contact material above the passage through which the main stream is withdrawn being about 200–400 times faster than the downward velocity of the contact material in the remainder of the settling zone, combining the side streams of contact material into a single side stream of gravitating material which has a substantially greater percentage of fine material than the main stream of contact material, removing the fines from the side stream, and returning the side stream to the main contact material stream substantially free of fine material.

4. In a hydrocarbon conversion process wherein a particle-form contact material is passed cyclically through a hydrocarbon conversion zone and a contact material regeneration zone through which zones it moves as a substantially compact column of solid particles, the method for removing fine particles resulting from attrition of the cyclically flowing contact material which method comprises: pneumatically conveying the particles of contact material upwardly through a lateraly confined lift passage, discharging the contact material from the top of the passage onto the surface of a substantially compact gravitating bed of the material in a pre-classifying zone of substantial cross-sectional area, withdrawing the main stream of contact material from a small portion of the bottom of the zone in the form of a continuous substantially compact column, withdrawing side streams of contact material from the remainder of the bottom of the zone at locations equally distributed thereabout, in the form of substantially compact columns of gravitating material, the side streams containing substantially higher percentages of fines than the main stream, combining the separate side streams to form a single gravitating side stream, removing the fines from the side stream, returning the fines-free stream to the main contact material stream and controlling the flow rate of the side stream, so that the flow of the side stream is about 2–10 percent of the flow of the main stream and the downward velocity of the contact material in the pre-classifying zone above the main stream column is about 200–400 times faster than the downward velocity of the contact material in the remainder of the zone.

5. In a hydrocarbon conversion process wherein a particle-form solid catalyst is passed cyclically through a hydrocarbon conversion zone and a contact material regeneration zone through which zones it moves as a substantially compact column of solid particles, the method of removing fine particles resulting from attrition of the cyclically flowing catalyst which comprises: pneumatically conveying the particles of contact material upwardly through a laterally confined lift passage from a feeding zone, discharging the catalyst from the top of the passage onto the surface of a substantially compact gravitating bed of the material in a pre-classifying zone of substantial cross-sectional area, withdrawing the main stream of catalyst from a small portion of the bottom of the zone in the form of a continuous substantially compact column, gravitating a drag stream from the main stream downwardly as a substantially compact column and discharging it at the surface of a bed of the catalyst in a combining zone, withdrawing side streams of contact catalyst from the remainder of the bottom of the pre-classifying zone at locations equally distributed about the remainder of the bottom of the zone as substantially compact columns having a much greater percentage of fines than the main catalyst stream, combining the separate side streams into a single stream, passing the stream of catalyst through an elutriation zone to effect removal of the fines, introducing the fines-free side stream into the top of the combining zone, withdrawing a substantially compact column of catalyst downwardly from beneath the combining zone to the upper portion of the feeding zone, the stream being withdrawn from a location substantially directly below the location of introduction of the fines-free side stream into the combining zone and laterally displaced from the location of introduction of the drag stream, so that an imaginary line connecting the nearest point of contact of the drag stream with that of the withdrawal stream is located at an angle slightly greater than the angle of internal flow of the catalyst, and controlling the rate of flow of the withdrawal stream so that the flow of the side stream is about 2–10 percent of the flow of the main stream and the downward velocity of the contact material in the preclassifying zone above the main stream column is about 200–400 times faster than the downward velocity of the contact material in the remainder of the zone.

6. In a hydrocarbon conversion system in which a reactor and regenerator are connected in series and a solid contact catalyst in particle-form is gravitated through both vessels and the connecting means in a continuous cyclic path, the improved apparatus for removing fine particles caused by attrition of the moving catalyst which comprises in combination: a gas lift pipe through which the contact material is upwardly conveyed by a lift gas, a pre-classifying vessel located at the top of the pipe, the pipe being terminated inside the vessel intermediate the top and bottom thereof, a downwardly directed conduit attached to the bottom of the vessel, adapted for the withdrawal of the main stream of the cyclically flowing catalyst, the area of the withdrawal aperture in the bottom of the vessel being substantially less than half the cross-sectional area of the vessel less the cross-sectional area of the lift pipe, a multiplicity of downwardly directed conduits attached to the bottom of the vessel at locations equally distributed about the remainder of the bottom of the vessel, so that catalyst in the vessel will be continuously moved in a downward direction across the entire cross-section of the vessel, the side stream conduits connected into a single downwardly directed conduit at their lower ends, means located in said single conduit for removing fines from the catalyst stream gravitated therethrough, said conduit being connected into the conversion system at its lower end whereby the fines-free catalyst is continuously returned to the main catalyst stream.

7. In a hydrocarbon conversion system in which a reactor and regenerator are connected in series and a solid contact catalyst in particle-form is gravitated through both vessels and carried through connecting means in a continuous cyclic path, the improved apparatus for removing fine particles caused by attrition of the moving catalyst which comprises in combination: a gas lift pipe through which the catalyst is upwardly conveyed by a lift gas, a pre-classifying vessel located at the top of the pipe, the pipe being terminated inside the vessel intermediate the top and bottom thereof, a downwardly directed conduit attached to the bottom of the vessel, adapted for withdrawal of the main stream of the cyclically flowing catalyst, the effective cross-sectional area of the vessel bearing a relation to the area of the withdrawal aperture, so that an imaginary line drawn in a vertical plane upwardly and outwardly from the edge of the aperture at an angle of about 70–85 degrees with the horizontal, when revolved about a vertical centerline through the center of the aperture, intersects an imaginary horizontal plane through the vessel at between about 2 to 20 feet above the bottom of the vessel to form a surface area of about $\frac{1}{3}$ to $\frac{1}{40}$ the effective cross-sectional area of the vessel, a multiplicity of withdrawal conduits substantially equally distributed about the bottom of the vessel, so as to keep the catalyst in the vessel moving in a downward direction across the entire effective cross-section of the vessel, a downwardly directed conduit attached to the bottom ends of the multiplicity of conduits, so as to effect the combination of the catalyst withdrawn therethrough into a single side stream, means located in said conduit for removing fines from the catalyst stream passing therethrough, said conduit being connected into the conversion system at its lower end whereby the fines-free catalyst is continuously returned to the main catalyst stream.

8. In a hydrocarbon conversion system in which a reactor and regenerator are connected in series and a solid contact catalyst in particle-form is gravitated through both vessels and the connecting means in a continuous cyclic path, the improved apparatus for removing fine particles caused by attrition of the moving catalyst which comprises in combination: a gas lift pipe through which the contact material is upwardly conveyed by a lift gas, a pre-classifying vessel located at the top of the pipe, the pipe being terminated inside the vessel intermediate the top and bottom thereof, a downwardly directed conduit attached to the bottom of the vessel, adapted for withdrawal of the main stream of the cyclically flowing catalyst, the effective cross-sectional area of the vessel bearing a relation to the area of the withdrawal aperture in the bottom of the vessel, so that an imaginary line drawn upwardly from the edge of the aperture at an angle of about 70–85 degrees with the horizontal when revolved about a vertical centerline through the center of the aperture intersects an imaginary horizontal plane through the vessel at between about 2 to 20 feet above the bottom of the vessel to form a surface area of about $\frac{1}{4}$–$\frac{1}{20}$ of the effective cross-sectional area, a multiplicity of withdrawal conduits substantially equally distributed about the bottom of the vessel, so as to keep the catalyst in the vessel moving in a downward direction across the entire effective cross-section of the vessel, a downwardly directed conduit attached to the bottom ends of the multiplicity of conduits, so as to combine the catalyst withdrawn therethrough into a single side stream, means located in said conduit for removing fines from the catalyst stream passing therethrough, said conduit being connected into the conversion system at its lower end whereby the fines-free catalyst is continuously returned to the main catalyst stream.

9. In a hydrocarbon conversion system in which a reactor and regenerator are connected in series and a solid contact catalyst in particle-form is gravitated through both vessels and the connecting means in a continuous cyclic path, the improved apparatus for removing fine particles caused by attrition of the moving catalyst which comprises in combination: a gas lift pipe through which the contact material is upwardly conveyed by a lift gas, a pre-classifying vessel located at the top of the pipe, the pipe being terminated inside the vessel intermediate the top and bottom thereof, a downwardly directed conduit attached to the bottom of the vessel, adapted for withdrawal of the main stream of the cyclically flowing catalyst, the effective cross-sectional area of the vessel bearing a relation to the area of the withdrawal aperture in the bottom of the vessel, so that an imaginary line drawn upwardly from the edge of the aperture in a vertical plane at an angle of about 75–80 degrees with the horizontal when revolved about a vertical centerline through the center of the apreture intersects an imaginary horizontal plane through the vessel at between about 2 to 20 feet above the bottom of the vessel to form a surface area of about $\frac{1}{4}$–$\frac{1}{20}$ of the effective cross-sectional area of the vessel, a multiplicity of withdrawal conduits substantially equally distributed about the bottom of the vessel, so as to keep the catalyst in the vessel moving in a downward direction across the entire effective cross-section of the vessel, a downwardly directed conduit attached to the bottom ends of the multiplicity of conduits, so as to effect the combining of the catalyst withdrawn therethrough into a single side stream, means located in said conduit for removing fines from the catalyst stream passing therethrough, said conduit connected into the conversion system at its lower end whereby the fines-free catalyst is continuously returned to the main catalyst stream.

10. In a hydrocarbon conversion system in which a reactor and regenerator are connected in series and a solid contact catalyst in particle-form is gravitated through both vessels and carried through connecting means in a continuous cyclic path, the improved apparatus for removing fine particles caused by attrition of the moving catalyst which comprises in combination: a gas lift pipe through which the catalyst is upwardly conveyed by a lift gas, a lift pot at the bottom of the pipe, with the pipe terminated inside the pot intermediate the top and bottom thereof, a preclassifying vessel located at the top of the pipe, the pipe being terminated inside the vessel intermediate the top and bottom thereof, a downwardly directed feed leg conduit attached to the bottom of the vessel, adapted for withdrawal of the main stream of the cyclically flowing catalyst, the effective cross-sectional area of the vessel bearing a relation to the area of the withdrawal aperture, so that an imaginary line drawn in a vertical plane upwardly and outwardly from the edge of the aperture at an angle of about 75–80 degrees with the horizontal, when revolved about a vertical axis of revolution passed through the centerline of the aperture, intersects an imaginary horizontal plane through the vessel at between about 2 to 20 feet above the bottom of the vessel to form a surface area of about $\frac{1}{4}$ to $\frac{1}{20}$ the size of the effective cross-sectional area of the vessel, a drag conduit attached at its upper end to the feed leg conduit, a combining box at the bottom of the drag conduit, a multiplicity of withdrawal conduits substantially equally distributed about the bottom of the pre-classifying vessel, so as to keep the catalyst in the vessel moving in a downward direction across the entire effective cross-section of the vessel, a downwardly directed elutriation conduit attached to the bottom ends of the multiplicity of condutis, so as to effect the combination of the catalyst withdrawn from the vessel into a single side stream, an elutriator located in the elutriation conduit, the lower end of the conduit being connected to the top of the combining box, a catalyst withdrawal conduit attached at its upper end to the bottom of the combining box and at its lower end to the upper portion of the lift pot, the withdrawal aperture in the combining box being located substantially directly below the discharge aperture of the elutriation conduit and adjacent the discharge aperture of the drag conduit, the nearest point of contact of the withdrawal aperture of the withdrawal conduit with the nearest point of contact of the discharge aperture of the drag conduit forming an imaginary line located at an angle slightly less than 75 degrees with the horizontal.

11. In a hydrocarbon conversion system in which a reactor and regenerator are connected in series and a solid contact catalyst in particle-form is gravitated through both vessels and the connecting means in a continuous cyclic path, the improved apparatus for removing fine particles caused by attrition of the moving catalyst which comprises in combination: a gas lift pipe through which the contact material is upwardly conveyed by a lift gas, a pre-classifying vessel located at the top of the pipe, the pipe being terminated inside the vessel intermediate the top and bottom thereof, a downwardly directed conduit attached to the bottom of the vessel, adapted for the withdrawal of the main stream of the cyclically flowing catalyst, the area of the withdrawal aperture in the bottom of the vessel being substantially less than half the cross-sectional area of the vessel less the cross-sectional area of the lift pipe, a multiplicity of downwardly directed conduits attached to the bottom of the vessel at locations equally distributed about the remainder of the bottom of the vessel, so as to permit withdrawal of side streams of catalyst through side stream outlets in the bottom of the vessel, substantially flat circular tables disposed one above each outlet in a substantially horizontal plane, said tables located above the bottom of the vessel such that imaginary lines drawn downwardly and inwardly from the periphery of the table at an angle of about 45 degrees intersect at about the bottom of the vessel, at least one depending conduit attached to said tables near the center thereof, said conduits terminated beneath the intercept of imaginary lines drawn downwardly and inwardly from the periphery of the tables at an angle of about 30 degrees with the horizontal but above the bottom of said vessel, said side stream conduits connected into a single downwardly directed conduit at their lower ends, means located in said single conduit for removing fines from the catalyst stream gravitated therethrough, said conduit being connected into the conversion system at its lower end whereby the fines-free catalyst is continuously returned to the main catalyst stream.

12. In a process which comprises circulating through a process system granular contact material comprising relatively fine and relatively coarse granules and which includes the steps of gravitating a relatively constricted seal leg stream of granular contact material from a relatively enlarged supply zone as a compact mass through a substantial vertical distance and of introducing a portion of the contact material in said system as an elutriator stream into an elutriating zone, the improvement which comprises: passing contact material down in said supply zone as a downwardly converging frusto-conical stream and thence into a seal leg stream; passing a small portion of the contact material in said frusto-conical stream down from the under surface of said frusto-conical stream into a downwardly converging second frusto-conical stream having lesser volumetric flow rate of solids than said first-named frusto-conical stream and thence into an elutriator stream; and separately removing said elutriator stream and said seal leg stream from a lower portion of said supply zone.

13. In apparatus for circulating through a process system granular solids comprising relatively fine and relatively coarse granules, the apparatus comprising a relatively enlarged supply hopper providing therein a space for gravitation of solids as a compact bed, an elutriator, a pressure reaction vessel beneath said supply hopper, and a relatively constricted seal leg conduit communicating with an outlet from a lower portion of said supply hopper and with said reaction vessel, the improvement which comprises: a conduit having smaller cross-sectional area than that of seal leg conduit and communicating with a second outlet from said supply hopper and with said elutriator, the vertical frusto-conical space which extends upwardly from the second outlet and which has sides inclined at the apparent angle of repose of said solids, intersecting in a substantial area of intersection within said space, the lower surface of the vertical frusto-conical space which extends upwardly from the first-named outlet and which has sides inclined at the apparent angle of repose of said solids.

14. In a process which comprises circulating through a process system granular contact material comprising relatively fine and relatively coarse granules and which includes the steps of pneumatically elevating granular contact material, discharging the elevated contact material into a relatively enlarged disengaging zone; gravitating a relatively constricted seal leg stream of granular contact material from a lower portion of said disengaging zone as a compact mass through a substantial vertical distance, and introducing a portion of the contact material in said system as an elutriator stream into an elutriating zone, the improvement which comprises: passing contact material downwardly in said disengaging zone as a downwardly converging frusto-conical stream and thence into said seal leg stream; passing a small portion of the contact material in said frusto-conical stream down from the under surface of said frusto-conical stream into a downwardly converging second frusto-conical stream having lesser volumetric flow rate of solids than said first-named frusto-conical stream and thence into said elutriator; and separately removing said elutriator stream and said seal leg stream from a lower portion of said disengaging zone.

15. In apparatus for circulating through a process system granular solids comprising relatively fine and relatively coarse granules, the apparatus comprising a lift conduit, means for pneumatically elevating granular solids through said lift conduit, a relatively enlarged disengaging vessel communicating with the upper end of said lift conduit and providing, beneath said upper end of said lift conduit, a space for gravitation of solids as a compact bed, an elutriator, a pressure reaction vessel beneath said disengaging vessel, and a relatively constricted seal leg conduit communicating with an outlet from a lower portion of said disengaging vessel and with said reaction vessel, the improvement which comprises: a conduit having smaller cross-sectional area than that of said seal leg conduit and communicating with a second outlet from said lower portion of said disengaging vessel and with said elutriator, the vertical frusto-conical space which extends upwardly from the second outlet and which has sides inclined at the apparent angle of repose of said solids intersecting, in a substantial area of intersection within said space, the lower surface of the vertical frusto-conical space which extends upwardly from the first-named outlet and which has sides inclined at the apparent angle of repose of said solids.

16. In a process which comprises circulating through a process system granular contact material comprising relatively fine and relatively coarse granules and which includes the steps of gravitating a relatively constricted seal leg stream of granular contact material from a relatively enlarged supply zone as a compact mass through a substantial vertical distance and of introducing a portion of the contact material in said system as an elutriator stream into an elutriating zone, the improvement which comprises: passing contact material down in said supply zone as a downwardly converging frusto-conical stream and thence into a seal leg stream; passing a small portion of the contact material in said frusto-conical stream down from the under surface of said frusto-conical stream into a downwardly converging second frusto-conical stream having lesser volumetric flow rate of solids than said first-named frusto-conical stream and thence into an elutriator stream; and separately removing said elutriator stream and said seal leg stream from a lower portion of said supply zone.

17. In apparatus for circulating through a process system granular solids comprising relatively fine and relatively coarse granules, the apparatus comprising a relatively enlarged supply hopper providing therein a space for gravitation of solids as a compact bed, an elutriator, a pressure reaction vessel beneath said supply hopper, and a relatively constricted seal leg conduit communicating with an outlet from a lower portion of said supply hopper and with said reaction vessel, the improvement which comprises: a conduit having smaller cross-sectional area than that of said seal leg conduit and communicating with a second outlet from said supply hopper and with said elutriator, the vertical frusto-conical space which extends upwardly from the second outlet and which has sides inclined at the apparent angle of repose of said solids intersecting in a substantial area of intersection within said space the lower surface of the vertical frusto-conical space which extends upwardly from the first-named outlet and which has sides inclined at the apparent angle of repose of said solids.

References Cited in the file of this patent

UNITED STATES PATENTS

| | | |
|---|---|---|
| 2,423,813 | Lechthaler et al. | July 8, 1947 |
| 2,491,446 | Hagerbaumer | Dec. 13, 1949 |
| 2,561,409 | Ardern | July 24, 1951 |
| 2,656,306 | Bergstrom et al. | Oct. 20, 1953 |
| 2,666,731 | Bergstrom | Jan. 19, 1954 |

OTHER REFERENCES

Measurement of Solids in TCC Process, Kelly, The Petroleum Eng., Sept. 1945, pp. 136, 138 and 142.

Houdriflow, "New Design in Catalytic Cracking," Oil and Gas Journal, Jan. 13, 1949, vol. 47, pp. 78 and 79.

"Houdriflow Catalytic Cracking," Oil and Gas Journal, Mar. 29, 1951, vol. 49, pp. 180 and 181.